(12) United States Patent
Misaizu et al.

(10) Patent No.: US 11,268,802 B2
(45) Date of Patent: Mar. 8, 2022

(54) STRAIN GAUGE WITH IMPROVED DISTORTION OF MEASURED OBJECT

(71) Applicant: MINEBEA MITSUMI Inc., Nagano (JP)

(72) Inventors: Eiji Misaizu, Kanagawa (JP); Shigeyuki Adachi, Shizuoka (JP); Kosuke Kitahara, Kanagawa (JP); Toshiaki Asakawa, Shizuoka (JP); Atsushi Kitamura, Shizuoka (JP)

(73) Assignee: MINEBEA MITSUMI Inc., Nagano (JP)

( * ) Notice: Subject to any disclaimer, the term of this patent is extended or adjusted under 35 U.S.C. 154(b) by 70 days.

(21) Appl. No.: 16/763,340

(22) PCT Filed: Nov. 1, 2018

(86) PCT No.: PCT/JP2018/040744
§ 371 (c)(1),
(2) Date: Jul. 7, 2020

(87) PCT Pub. No.: WO2019/098049
PCT Pub. Date: May 23, 2019

(65) Prior Publication Data
US 2021/0063133 A1    Mar. 4, 2021

(30) Foreign Application Priority Data

Nov. 15, 2017 (JP) .............................. JP2017-220409

(51) Int. Cl.
*G01B 7/16* (2006.01)
(52) U.S. Cl.
CPC .................................... *G01B 7/18* (2013.01)

(58) Field of Classification Search
None
See application file for complete search history.

(56) References Cited

U.S. PATENT DOCUMENTS

| | | | |
|---|---|---|---|
| 5,914,168 | A | 6/1999 | Wakamatsu et al. |
| 2005/0188769 | A1 | 9/2005 | Moelkner et al. |
| 2018/0217016 | A1 | 8/2018 | Inamori et al. |

FOREIGN PATENT DOCUMENTS

| | | |
|---|---|---|
| EP | 725392 | 8/1996 |
| JP | H06-300649 | 10/1994 |

(Continued)

OTHER PUBLICATIONS

Office Action dated Jun. 3, 2021 with respect to the corresponding Chinese Patent Application No. 201880086299.3.

(Continued)

*Primary Examiner* — Lisa M Caputo
*Assistant Examiner* — Nigel H Plumb
(74) *Attorney, Agent, or Firm* — IPUSA, PLLC

(57) ABSTRACT

A strain gauge includes a flexible substrate, resistors each formed of a film that includes Cr, CrN, and $Cr_2N$, and a functional layer formed of a metal, an alloy, or a metal compound, the functional layer being in a lower surface of the resistors. The resistors include a first resistor formed on or above a predetermined surface of the substrate; a second resistor of which a grid direction faces a different direction from the first resistor, the second resistor formed on or above the predetermined surface of the substrate or a surface parallel to the predetermined surface; and a third resistor formed on or above a surface adjacent to the predetermined surface of the substrate.

9 Claims, 3 Drawing Sheets

(56) References Cited

FOREIGN PATENT DOCUMENTS

| | | |
|---|---|---|
| JP | H08-102163 | 4/1996 |
| JP | H09-016941 | 1/1997 |
| JP | H10-318862 | 12/1998 |
| JP | 2004-245717 | 9/2004 |
| JP | 2007-173544 | 7/2007 |
| JP | 2015-031633 | 2/2015 |
| JP | 2016-074934 | 5/2016 |
| JP | 2016-136605 | 7/2016 |
| JP | 2017-067764 | 4/2017 |
| JP | 2017-101983 | 6/2017 |

OTHER PUBLICATIONS

International Search Report for PCT/JP2018/040744 dated Jan. 29, 2019.

STRAIN GAUGE WITH IMPROVED DISTORTION OF MEASURED OBJECT

TECHNICAL FIELD

The present invention relates to a strain gauge.

BACKGROUND ART

A strain gauge is known to be attached to a measured object to detect strain on the measured object. The strain gauge includes a resistor for detecting strain, and as a resistor material, for example, material including Cr (chromium) or Ni (nickel) is used. The resistor is formed on a substrate made of, for example, an insulating resin (see, for example, Patent document 1).

CITATION LIST

Patent Document

[Patent document 1] Japanese Unexamined Patent Application Publication No. 2016-74934

SUMMARY

The conventional strain gauge can only detect strain on a surface of the measured object. However, there also exists requirements for strain of other than the surface to be detected.

In view of the point described above, an object of the present invention is to provide a strain gauge whereby it is possible to detect strain on the surface of a measured object, as well as strain of other than the surface.

A strain gauge includes a flexible substrate; and resistors each formed of material including at least one from among chromium and nickel, on or above the substrate, wherein the resistors include a first resistor formed on or above a predetermined surface of the substrate; a second resistor of which a grid direction faces a different direction from the first resistor, the second resistor formed on or above the predetermined surface of the substrate or a surface parallel to the predetermined surface; and a third resistor formed on or above a surface adjacent to the predetermined surface of the substrate.

Effects of the Invention

According to the disclosed technique, a strain gauge can be provided whereby it is possible to detect strain on the surface of a measured object, as well as strain of other than the surface.

DESCRIPTION OF EMBODIMENTS

One or more embodiments will be hereinafter described with reference to the drawings. In each figure, the same numerals denote the same components; accordingly, duplicative explanations may be omitted.

First Embodiment

Figure 1:
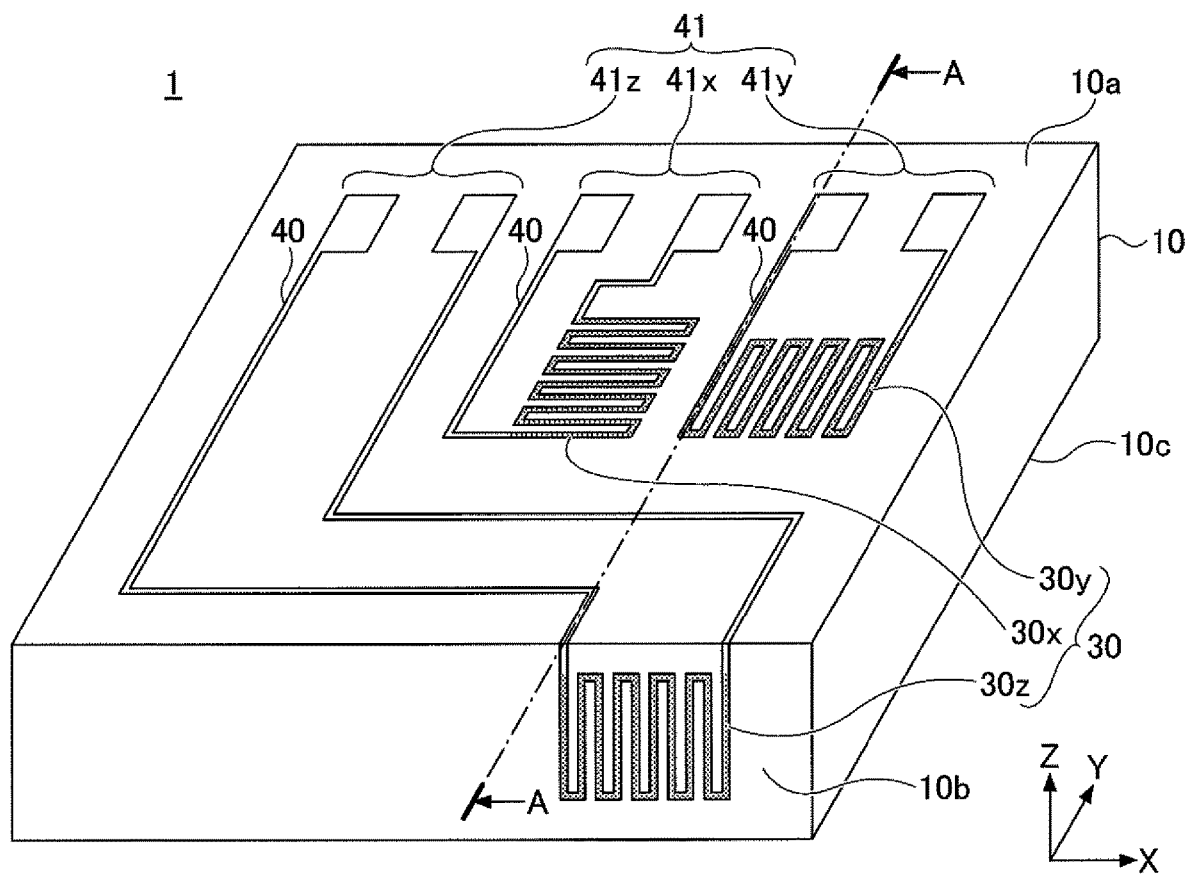
FIG. 1 is a perspective view of an example of a strain gauge according to a first embodiment.
Figure 2:
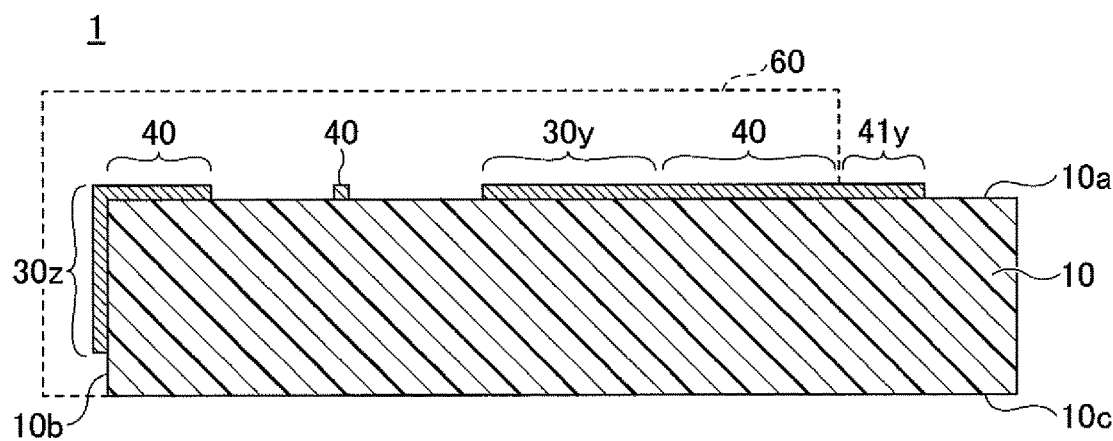
FIG. 2 is a cross-sectional view (part 1) of an example of the strain gauge according to the first embodiment.

FIG. 1 is a perspective view of an example of a strain gauge according to a first embodiment. FIG. 2 is a cross-sectional view of an example of the strain gauge according to the first embodiment, and illustrates a cross section that is cut in a direction parallel to a Y-Z plane and that is taken along the A-A line in FIG. 1. With reference to FIGS. 1 and 2, the strain gauge 1 includes a substrate 10; resistors 30 (resistors 30$x$, 30$y$, and 30$z$); and terminal sections 41 (terminal sections 41$x$, 41$y$, and 41$z$).

Note that in the present embodiment, for the sake of convenience, with respect to the strain gauge 1, the side of the substrate 10 where the resistor 30$x$ is provided is referred to as an upper side or one side; and the side of the substrate 10 opposite to the side where the resistor 30$x$ is provided is referred to as a lower side or another side. Further, for each component, the surface on the side where the resistor 30$x$ is provided is referred to as one surface or an upper surface; and the surface on the side opposite to the side where the resistor 30$x$ is provided is referred to as another surface or a lower surface. However, the strain gauge 1 can be used in a state of being upside down, or be disposed at any angle. Further, a plan view means that an object is viewed from a normal direction of an upper surface 10$a$ of the substrate 10, and a planar shape refers to a shape of an object when viewed from the normal direction of the upper surface 10$a$ of the substrate 10.

The substrate 10 is a member that is a base layer for forming the resistor 30$x$ or the like and is flexible. The thickness of the substrate 10 is not particularly restricted, and can be appropriately selected for any purpose. For example, such a thickness can be approximately between 5 μm and 1000 μm. In particular, when the thickness of the substrate 10 is between 5 μm and 200 μm, it is preferable in terms of strain transfer from a flexure element surface that is bonded to a lower surface of the substrate 10 via an adhesive layer or the like; and dimensional stability with respect to environment, and when the thickness is 10 μm or more, it is further preferable in terms of insulation.

The substrate 10 can be formed of an insulating resin film such as a PI (polyimide) resin, an epoxy resin, a PEEK (polyether ether ketone) resin, a PEN (polyethylene naphthalate) resin, a PET (polyethylene terephthalate) resin, a PPS (polyphenylene sulfide) resin, or a polyolefin resin. Note that the film refers to a flexible member having a thickness of about 500 μm or less.

Here, the "formed of an insulating resin film" is not intended to preclude the substrate 10 from containing fillers, impurities, or the like in the insulating resin film. The substrate 10 may be formed of, for example, an insulating resin film containing fillers such as silica or alumina.

Each resistor 30 is formed on the substrate 10 and is a sensitive section where resistance varies according to strain. The resistors 30 include the resistors 30$x$, 30$y$, and 30$z$. In other words, the resistors 30$x$, 30$y$, and 30$z$ are collectively referred to as the resistors 30. When it is not particularly necessary to distinguish among the resistors 30$x$, 30$y$, and 30$z$, they are collectively referred to as the resistors 30. Note that in FIG. 1, for the sake of convenience, the resistors 30$x$, 30$y$, and 30$z$ are each illustrated in a crepe pattern.

The resistor 30$x$ is a thin film formed in a predetermined pattern and on the substrate 10, and is the sensitive section where resistance varies according to strain. The resistor 30$x$ may be formed directly on the upper surface 10a of the substrate 10, or be formed above the upper surface 10a of the substrate 10, via other layer(s). Note that FIG. 1 illustrates a three-dimensional Cartesian coordinate system in which a grid direction of the resistor 30x is an X direction. Thereby, the resistor 30x can detect strain in the X direction.

The resistor 30y is a thin film formed in a predetermined pattern and on the substrate 10, and is the sensitive section where resistance varies according to strain. The resistor 30y may be formed directly on the upper surface 10a of the substrate 10, or be formed above the upper surface 10a of the substrate 10, via other layer(s). The resistor 30y is disposed such that a grid direction of the resistor 30y is a Y direction, and can detect strain in the Y direction.

The resistor 30z is a thin film formed in a predetermined pattern and on a side substrate 10b adjacent to the upper surface 10a of the substrate 10, and is the sensitive section where resistance varies according to strain. The resistor 30z may be formed directly on the side surface 10b of the substrate 10, or be formed above the side surface 10b of the substrate 10, via other layer(s). The side surface 10b of the substrate 10 is approximately perpendicular to the upper surface 10a. The resistor 30z is disposed such that a grid direction of the resistor 30z is a Z direction, and can detect strain in the Z direction.

In such a manner, the resistor 30x, the resistor 30y, and the resistor 30z are arranged such that the grid directions of the resistor 30x, the resistor 30y, and the resistor 30z are mutually perpendicular.

The resistors 30 can be each formed of, for example, material including Cr (chromium); material including Ni (nickel); or material including both of Cr and Ni. In other words, the resistors 30 can be each formed of material including at least one from among Cr and Ni. An example of the material including Cr includes a Cr composite film. An example of the material including Ni includes Cu—Ni (copper nickel). An example of the material including both of Cr and Ni includes Ni—Cr (nickel chromium).

Here, the Cr composite film is a composite film of Cr, CrN, Cr$_2$N, and the like. The Cr composite film may include incidental impurities such as chromium oxide.

The thickness of each resistor 30 is not particularly restricted, and can be appropriately selected for any purpose. The thickness can be, for example, approximately between 0.05 μm and 2 μm. In particular, when the thickness of each resistor 30 is 0.1 μm or more, it is preferable in terms of improvement in crystallinity (e.g., crystallinity of α-Cr) of a crystal that constitutes the resistor 30, and when the thickness of each resistor 30 is 1 μm or less, it is further preferable in terms of reduction in cracks of a given film caused by internal stress of the film that constitutes the resistor 30, or reduction in warp in the substrate 10.

For example, when each resistor 30 is the Cr composite film, the resistor is formed with α-Cr (alpha-chromium) as the main component having a stable crystalline phase, so that stability of the gauge characteristics can be improved. Additionally, when each resistor 30 is formed with α-Cr as the main component, a gauge factor of the strain gauge 1 can be 10 or more, as well as a gauge factor temperature coefficient TCS and temperature coefficient of resistance TCR being able to be each in the range of from −1000 ppm/° C. to +1000 ppm/° C. Here, a main component means that a target substance has 50% by weight or more of total substances that constitute the resistor. Each resistor 30 preferably includes α-Cr at 80% by weight or more, from the viewpoint of improving the gauge characteristics. Note that α-Cr is Cr having a bcc structure (body-centered cubic structure).

The terminal sections 41x respectively extend from both end portions of the resistor 30x, through a given interconnect pattern 40, and are each wider than the resistor 30x to be formed in an approximately rectangular shape, in a plan view. The terminal sections 41x are a pair of electrodes from which a change in a resistance value of the resistor 30x according to strain is output externally, where, for example, a lead wire for an external connection, or the like is joined. For example, the resistor 30z extends from one of the terminal sections 41x, with zigzagged hairpin turns, to be connected to another terminal section 41x, through the interconnect pattern 40.

The terminal sections 41y respectively extend from both end portions of the resistor 30y, through a given interconnect pattern 40, and are each wider than the resistor 30y to be formed in an approximately rectangular shape, in a plan view. The terminal sections 41y are a pair of electrodes from which a change in a resistance value of the resistor 30y according to strain is output externally, where, for example, a lead wire for an external connection, or the like is joined. For example, the resistor 30y extends from one of the terminal sections 41y, with zigzagged hairpin turns, to be connected to another terminal section 41y, through the interconnect pattern 40.

The terminal sections 41z respectively extend from both end portions of the resistor 30z, through a given interconnect pattern 40, and are each wider than the resistor 30z to be formed in an approximately rectangular shape, in a plan view. The terminal sections 41z are a pair of electrodes from which a change in a resistance value of the resistor 30z according to strain is output externally, where, for example, a lead wire for an external connection, or the like is joined. For example, the resistor 30z extends from one of the terminal sections 41z, with zigzagged hairpin turns, to be connected to another terminal section 41z, through the interconnect pattern 40.

In the example in FIG. 1, the terminal sections 41x, 41y, and 41z are formed on the upper surface 10a of the substrate 10, but is not limited thereto. The terminal sections 41x, 41y, and 41z can be each formed on any surface of the substrate 10. The terminal sections 41x, 41y, and 41z may not be formed on the same surface of the substrate 10.

The upper surface of each of the terminal sections 41x, 41y, and 41z may be coated with a metal allowing for increased solderability than the terminal sections 41x, 41y, and 41z. Note that for the sake of convenience, the resistor 30x, the resistor 30y, the terminal section 41x, the terminal section 41y, and the terminal section 41z are expressed by different numerals. However, those can be integrally formed of the same material, in the same process.

Note that when it is not particularly necessary to distinguish among the terminal sections 41x, 41y, and 41z, they are collectively referred to as the terminal sections 41.

A cover layer 60 (insulating resin layer) may be provided on and above the upper surface 10a and the side surface 10b of the substrate 10, such that the resistors 30 are coated and the terminal sections 41 are exposed. With the cover layer 60 being provided, mechanical damage, and the like can be prevented from occurring in each resistor 30. Additionally, with the cover layer 60 being provided, each resistor 30 can be protected against moisture, and the like. Note that the cover layer 60 may be provided to cover all portions except for the terminal sections 41. In FIG. 1, illustration of the cover layer 60 is omitted.

The cover layer 60 can be formed of an insulating resin such as a PI resin, an epoxy resin, a PEEK resin, a PEN resin, a PET resin, or a PPS resin, a composite resin (e.g., a silicone resin or a polyolefin resin). The cover layer 60 may contain fillers or pigments. The thickness of the cover layer 60 is not particularly restricted, and can be appropriately selected for any purpose. For example, the thickness may be approximately between 2 µm and 30 µm.

In order to manufacture the strain gauge 1, first, the substrate 10 is prepared and a metallic layer (which may be referred to as a metallic layer 300, for the sake of convenience), which is finally patterned to become the resistors 30 and the terminal sections 41, is formed on the entire upper surface 10a and side surface 10b of the substrate 10. The material and thickness of the metallic layer 300 are the same as the material and thickness for each of the resistors 30 and the terminal sections 41.

The metallic layer 300 can be formed to be deposited by magnetron sputtering in which, for example, a raw material capable of forming the metallic layer 300 is a target. Instead of magnetron sputtering, the metallic layer 300 may be deposited by reactive sputtering, vapor deposition, arc ion plating, pulsed laser deposition, or the like.

From the viewpoint of stabilizing the gauge characteristics, before depositing the metallic layer 300, preferably, as a base layer, a functional layer having a film thickness that is approximately between 1 nm and 100 nm is vacuum-deposited on the upper surface 10a and the side surface 10b of the substrate 10, by conventional sputtering, for example.

In the present application, the functional layer refers to a layer that has a function of promoting crystal growth of the resistors 30 (where the metallic layer 300 is patterned) each of which is at least an upper layer. The functional layer preferably further has a function of preventing oxidation of the resistors 30, caused by oxygen and moisture included in the substrate 10, as well as a function of improving adhesion between the substrate 10 and a given resistor 30. The functional layer may further have other functions.

An insulating resin film that constitutes the substrate 10 contains oxygen and moisture. In this regard, particularly when each resistor 30 includes Cr, it is effective for the functional layer to have a function of preventing oxidation of the resistor 30, because Cr forms an autoxidized film.

The material of the functional layer is not particularly restricted as long as it is material having a function of promoting crystal growth of the resistors 30 each of which is at least an upper layer. Such material can be appropriately selected for any purpose, and includes one or more metals selected from the group consisting of, for example, Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Tr (iridium), Pt (platinum), Pd (palladium), Ag (silver), Au (gold), Co (cobalt), Mn (manganese), and Al (aluminum); an alloy of any metals from among the group; or a compound of any metal from among the group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

The functional layer can be vacuum-deposited by, for example, conventional sputtering in which a raw material capable of forming the functional layer is the target and in which an Ar (argon) gas is supplied to a chamber. By using conventional sputtering, the functional layer is deposited while the upper surface 10a and the side surface 10b of the substrate 10 is etched with Ar. Thus, a deposited amount of the film of the functional layer is minimized and thus an effect of improving adhesion can be obtained.

However, this is an example of a method of depositing the functional layer, and the functional layer may be deposited by other methods. For example, before depositing the functional layer, the upper surface 10a and the side surface 10b of the substrate 10 is activated by plasma treatment using Ar, etc. or the like to thereby obtain the effect of improving the adhesion; subsequently, the functional layer may be vacuum-deposited by magnetron sputtering.

A combination of the material of the functional layer and the material of the metallic layer 300 that becomes the resistors 30 and the terminal sections 41 is not particularly restricted, and can be appropriately selected for any purpose. For example, Ti is used for the functional layer, and a Cr composite film formed with α-Cr (alpha-chromium) as the main component can be deposited as the metallic layer 300.

In this case, the metallic layer 300 can be deposited by, for example, magnetron sputtering in which a raw material capable of forming the Cr composite film is the target and in which an Ar gas is supplied to a chamber. Alternatively, the metallic layer 300 may be deposited by reactive sputtering in which pure Cr is the target and in which an appropriate amount of nitrogen gas, as well as an Ar gas, are supplied to a chamber.

In such methods, a growth face of the Cr composite film is defined by the functional layer formed of Ti, and the Cr composite film that is formed with α-Cr as the main component having a stable crystalline structure can be deposited. Also, Ti that constitutes the functional layer is diffused into the Cr composite film, so that the gauge characteristics are improved. For example, the gauge factor of the strain gauge 1 can be 10 or more, as well as the gauge factor temperature coefficient TCS and temperature coefficient of resistance TCR being each able to be in the range of from −1000 ppm/° C. to +1000 ppm/° C. Note that, when the functional layer is formed of Ti, the Cr composite film may include Ti or TiN (titanium nitride).

Note that when each resistor 30 is the Cr composite film, the functional layer formed of Ti includes all functions being a function of promoting crystal growth of the resistor 30; a function of preventing oxidation of the resistor 30, caused by oxygen or moisture contained in the substrate 10; and a function of improving adhesion between the substrate 10 and the resistor 30. Instead of Ti, when the functional layer is formed of Ta, Si, Al, or Fe, the functional layer also includes the same functions.

As described above, with the functional layer being provided in the lower layer of each resistor 30, the crystal growth of the resistor 30 can be promoted and thus the resistor 30 having a stable crystalline phase can be fabricated. As a result, with respect to the strain gauge 1, stability of the gauge characteristics can be improved. Also, the material that constitutes the functional layer is diffused into each resistor 30, so that the gauge characteristics of the strain gauge 1 can be thereby improved.

After depositing the functional layer and the metallic layer 300 that are on and above the entire upper surface 10a and side surface 10b of the substrate 10, the functional layer formed on the upper surface 10a of the substrate 10; and the metallic layer 300, as well as the functional layer formed on the side surface 10b of the substrate 10; and the metallic layer 300, are patterned in the shape in FIG. 1, by photolithography. Thereby, the resistors 30 and the terminal sections 41 are formed.

After forming the resistors 30 and the terminal sections 41, the cover layer 60 with which the resistors 30 are coated and that exposes the terminal sections 41 is provided on and above the upper surface 10a and the side surface 10b of the substrate 10, as necessary, so that the strain gauge 1 is completed. For example, the cover layer 60 can be fabricated, such that a thermosetting insulating resin film in a semi-cured state is laminated on the upper surface 10a and the side surface 10b of the substrate 10, and such that the resistors 30 are coated therewith and the terminal sections 41 are exposed; subsequently, heat is added and curing is performed. The cover layer 60 may be fabricated, such that a thermosetting insulating resin that is liquid or paste-like is applied to the upper surface 10a and the side surface 10b of the substrate 10, and such that the resistors 30 are coated therewith and the terminal sections 41 are exposed; subsequently, heat is added and curing is performed.

Figure 3:
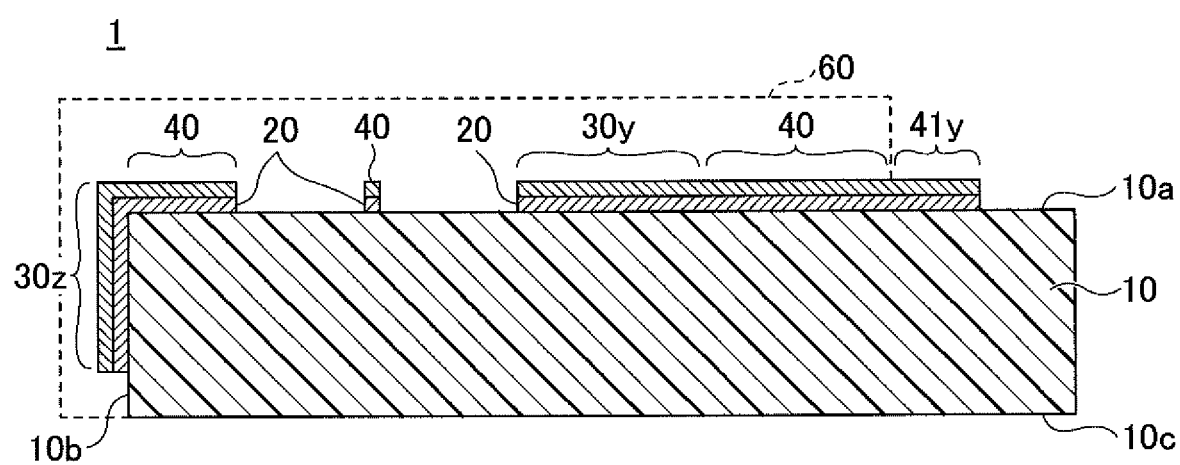
FIG. 3 is a cross-sectional view (part 2) of an example of the strain gauge according to the first embodiment.

Note that when the functional layer, as a base layer of the metallic layer 300 that becomes the resistors 30 and the terminal sections 41, is provided on the upper surface 10a and the side surface 10b of the substrate 10, the strain gauge 1 has a cross-section shape illustrated in FIG. 3. A layer expressed by the numeral 20 is the functional layer. The shape of the strain gauge 1 in the case of providing the functional layer 20 is the same as that in the perspective view in FIG. 1.

As described above, the resistor 30x in which the grid direction of the resistor 30x faces the X direction; and the resistor 30y in which the grid direction of the resistor 30y faces the Y direction are each formed on or above the upper surface 10a of the substrate 10, and, the resistor 30z in which the grid direction of the resistor 30z faces the Z direction is formed on or above the side surface 10b of the substrate 10. Thereby, strain in three directions of X, Y, and Z can be simultaneously detected.

Modification 1 of the First Embodiment

Modification 1 of the first embodiment provides an example of a strain gauge that differs in the substrate shape from the first embodiment. Note that in the modification 1 of the first embodiment, explanation for the components that are the same as the components that have been described in the first embodiment may be omitted.

Figure 4:
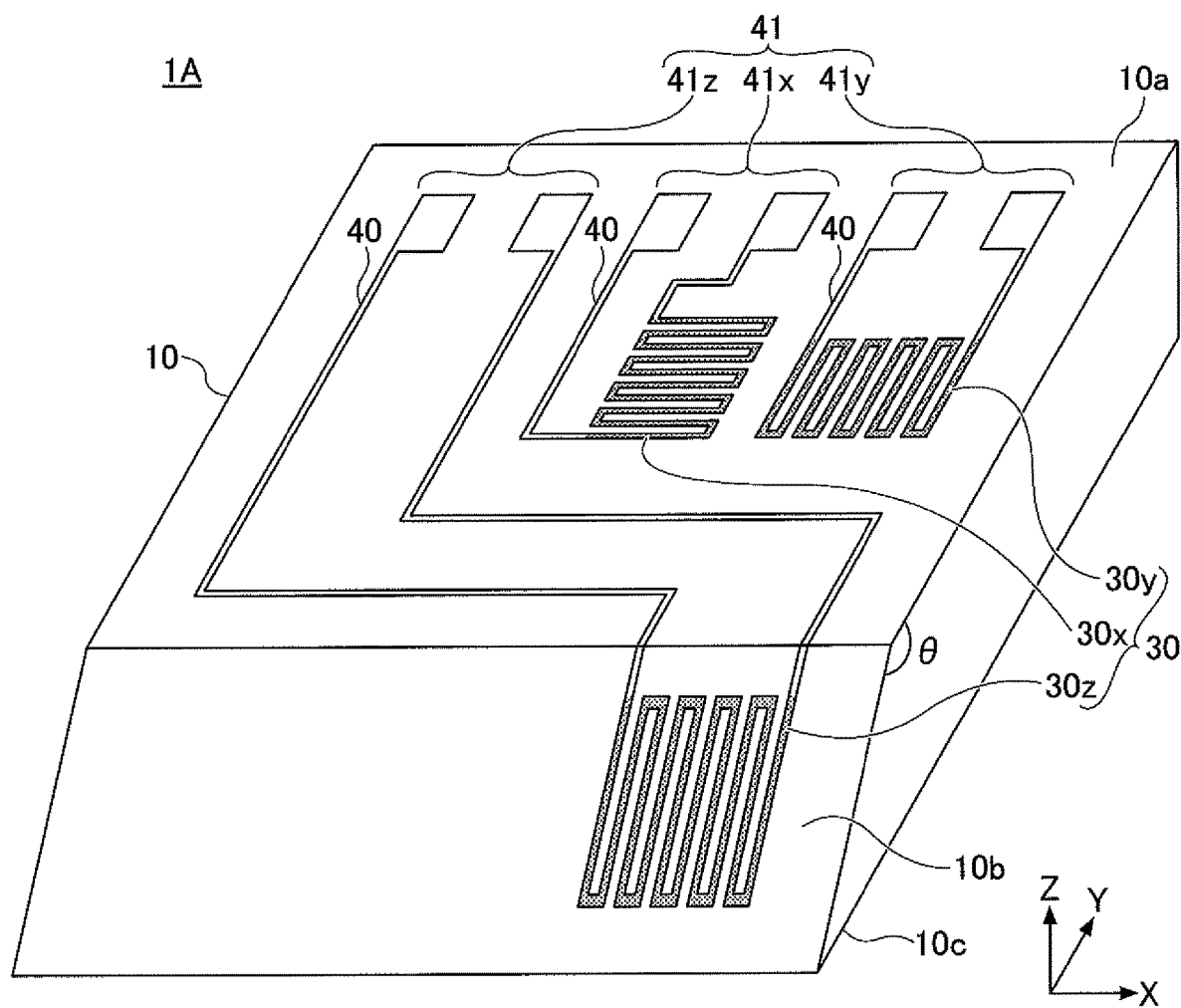
FIG. 4 is a perspective view of an example of a strain gauge according to modification 1.

FIG. 4 is a perspective view of an example of the strain gauge according to the modification 1 of the first embodiment. With reference to FIG. 4, the strain gauge 1A differs from the strain gauge 1 (see FIGS. 1 and 2, etc.) in that the side surface 10b of the substrate 10 is not approximately perpendicular to the upper surface 10a.

An angle θ between the side surface 10b of the substrate 10 and the upper surface 10a is an obtuse angle, and can be set as θ=135 degrees, for example. The side surface 10b of the substrate 10 can be taken as a surface inclined relative to the upper surface 10a, by buffing, for example.

As described above, with the angle θ between the side surface 10b of the substrate 10 and the upper surface 10a being the obtuse angle, when the metallic layer 300 deposited on the side surface 10b of the substrate 10 is patterned by photolithography to become the resistor 30z, exposure can be easily achieved.

Note that with respect to the strain gauge 1A, because the grid direction of the resistor 30z does not face the Z direction, a resistance value of the resistor 30z changes according to strain in the Y direction and strain in the Z direction. Thus, strain in the Z direction cannot be detected directly. In order to detect the strain in the Z direction, for example, the change in the resistance value of the resistor 30z may be adjusted using the change in a given resistance value of the resistor 30y. Alternatively, the change in the resistance value of the resistor 30z may be adjusted based on an inclination angle (=180−θ) of the side surface 10b. Note, however, that when strain in the direction of the side surface 10b of the substrate 10 is detected, adjustment is not required.

The preferred embodiment and the like have been described above, but are not limited to the above embodiment and the like. Various modifications and alternatives to the above embodiment and the like can be made without departing from a scope set forth in the claims.

For example, according to the first embodiment and the modification 1 of the first embodiment, the resistor 30x is formed such that the grid direction of the resistor 30x is the X direction, and the resistor 30Y is formed such that the grid direction of the resistor 30y is the Y direction. However, those directions are not limited to the above directions. The resistor 30y may be formed on or above a predetermined surface of the substrate 10, such that the grid direction of the resistor 30y faces a different direction from the resistor 30x. For example, the resistor 30y can be formed on or above a predetermined surface of the substrate 10, such that the grid direction of the resistor 30y faces a direction inclined at 45 degrees relative to the resistor 30x.

The resistor 30x and the resistor 30y are not required to be formed on the same surface of the substrate 10, and may be formed on respective surfaces parallel to the substrate 10. For example, the resistor 30x is formed on or above the upper surface 10a of the substrate 10, and the resistor 30y can be formed on or below a lower surface 10c parallel to the upper surface 10a of the substrate 10.

As necessary, one or more resistors may be formed on one or more surfaces where the resistors described in the first embodiment and the modification of the first embodiment are not formed.

This International application claims priority to Japanese Patent Application No. 2017-220409, filed Nov. 15, 2017, the contents of which are incorporated herein by reference in their entirety.

REFERENCE SIGNS LIST 1, 1A strain gauge, 10 substrate, 10a upper surface, 10b side surface, 10c lower surface, 20 functional layer, 30 resistor, 30x, 30y, 30z resistor, 40 interconnect pattern, 41, 41x, 41y, 41z terminal section, 60 cover layer

The invention claimed is:
1. A strain gauge comprising:
a flexible resin substrate;
resistors each formed of a film that includes Cr, CrN, and $Cr_2N$; and
a functional layer formed of a metal, an alloy, or a metal compound, the functional layer being in a lower surface of the resistors,
wherein an element included in the functional layer is diffused into the film,
wherein the resistors include:
a first resistor formed on or above a predetermined surface of the substrate;
a second resistor of which a grid direction faces a different direction from the first resistor, the second resistor formed on or above the predetermined surface of the substrate or a surface parallel to the predetermined surface; and a third resistor formed on or above a surface adjacent to the predetermined surface of the substrate, and wherein a gauge factor of the strain gauge is 10 or more.

2. The strain gauge according to claim 1, wherein an angle between the surface adjacent to the predetermined surface and the predetermined surface is an obtuse angle.

3. The strain gauge according to claim 1, wherein the first resistor, the second resistor, and the third resistor are arranged such that grid directions of the first resistor, the second resistor, and the third resistor are mutually perpendicular.

4. The strain gauge according to claim 1, wherein a main component of each resistor is alpha-chromium.

5. The strain gauge according to claim 4, wherein each resistor includes alpha-chromium at 80% by weight or more.

6. The strain gauge according to claim 1, wherein the functional layer includes a function of promoting crystal growth of the resistor.

7. The strain gauge according to claim 1, further comprising an insulating resin layer with which the resistors are coated.

8. A strain gauge comprising:
a flexible resin substrate;
resistors each formed of a film that includes Cr, CrN, and $Cr_2N$; and
a functional layer formed of a metal, an alloy, or a metal compound, the functional layer being in a lower surface of the resistors,
wherein an element included in the functional layer is diffused into the film,
wherein the resistors include:
a first resistor formed on or above a predetermined surface of the substrate;
a second resistor of which a grid direction faces a different direction from the first resistor, the second resistor formed on or above the predetermined surface of the substrate or a surface parallel to the predetermined surface; and
a third resistor formed on or above a surface adjacent to the predetermined surface of the substrate, and
wherein a temperature coefficient of resistance of the strain gauge is in a range of from −1000 ppm/° C. to +1000 ppm/° C.

9. A strain gauge comprising:
a flexible resin substrate;
resistors each formed of a film that includes Cr, CrN, and $Cr_2N$; and
a functional layer formed of a metal, an alloy, or a metal compound, the functional layer being in a lower surface of the resistors,
wherein the resistors include:
a first resistor formed on or above a predetermined surface of the substrate;
a second resistor of which a grid direction faces a different direction from the first resistor, the second resistor formed on or above the predetermined surface of the substrate or a surface parallel to the predetermined surface; and
a third resistor formed on or above a surface adjacent to the predetermined surface of the substrate.

* * * * *